UNITED STATES PATENT OFFICE.

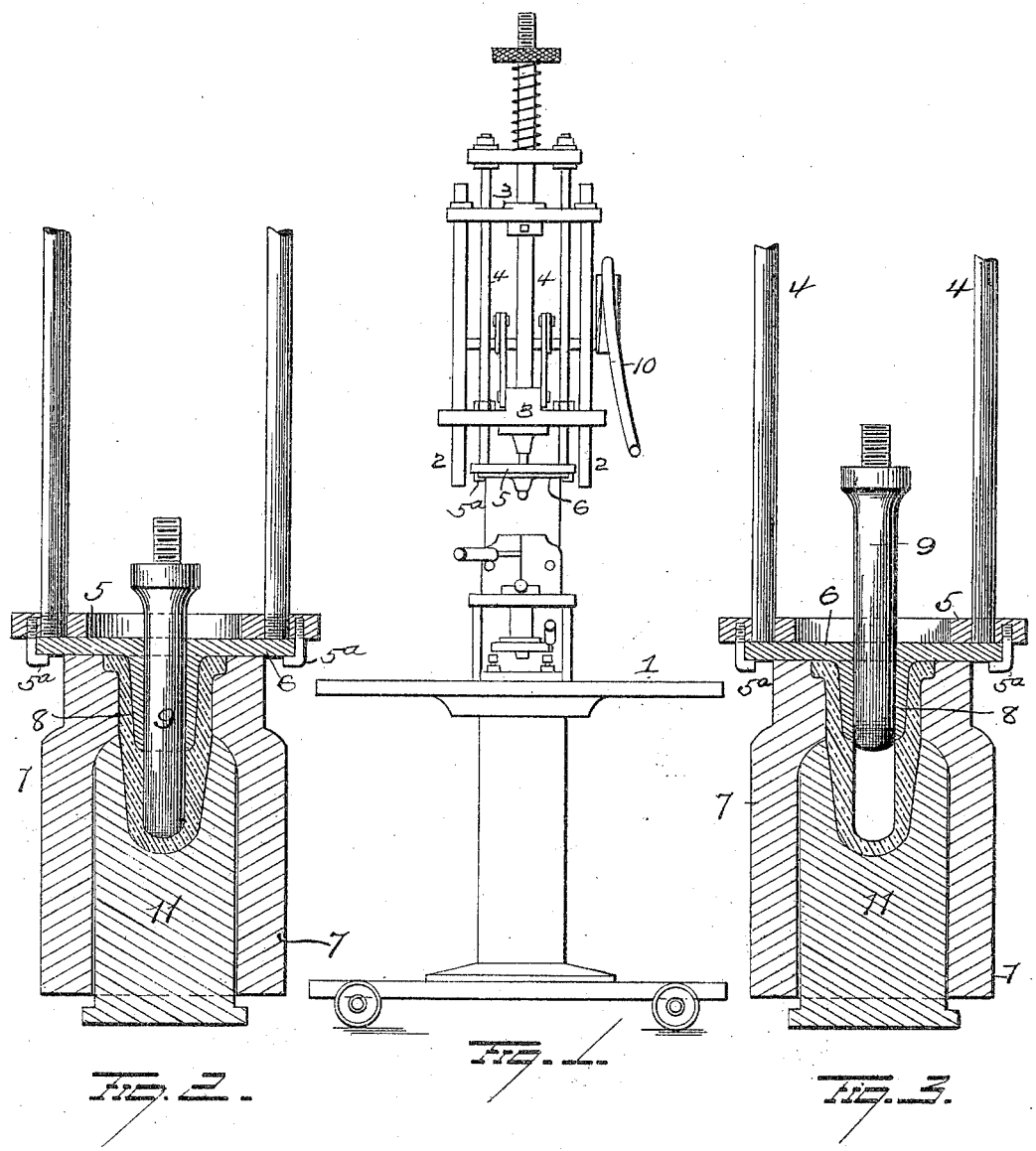

JAMES D. COX, OF BRIDGETON, NEW JERSEY.

BOTTLE-MAKING APPARATUS.

No. 821,610.          Specification of Letters Patent.          Patented May 29, 1906.

Application filed June 29, 1903. Serial No. 163,575.

*To all whom it may concern:*

Be it known that I, JAMES D. COX, a resident of Bridgeton, in the county of Cumberland and State of New Jersey, have invented certain new and useful Improvements in Bottle-Making Apparatus; and I do hereby declare the following to be a full, clear, and exact description of the invention, such as will enable others skilled in the art to which it appertains to make and use the same.

My invention relates to an improved bottle-making apparatus, the object of the invention being to provide improved mechanism whereby the interior of the bottle-neck is formed perfectly smooth without ridge or groove; and with this object in view the invention consists in certain novel features of construction and combinations and arrangements of parts, as will be more fully hereinafter described, and pointed out in the claims.

Heretofore in the manufacture of bottles it has been the common practice to force a plunger down into a quantity of molten glass in the mold to form the neck of the bottle and also form a depression in the glass, into which the air is forced to blow the bottle. After forming the neck the plunger must be withdrawn, and in doing so, owing to the suction and other causes, a ridge, groove, or other unevenness is made in the interior of the neck or at its upper edge, and it is the purpose of my invention to overcome this defect and form a bottle with perfectly smooth surface in the interior of the neck and perfectly-formed upper edge.

In the accompanying drawings, Figure 1 is a view in elevation, illustrating a section of machine to illustrate the operation of the apparatus. Fig. 2 is an enlarged view in section through the mold, showing my improvements therein; and Fig. 3 is a similar view.

1 represents a mold-supporting table, which is preferably rotary to permit the mold to be readily moved from below the plunger to a blow-head. Vertical parallel rods 2 are secured to the frame and serve as guides for a movable frame 3, comprising cross-heads 3 and vertical parallel rods 4. The lower ends of these rods 4 are secured to a ring 5, having hook-shaped lugs or pins $5^a$ on its lower face to secure in position my improved follower-plate 6. This follower-plate comprises a disk to be moved against the top of the mold 7 and is provided with a central hollow depending neck-former 8, having an exterior contour the same as the interior of the bottle-neck to be formed, and the plunger 9 is movable in this former 8 and extends up into the frame and through the cross-heads. A suitable hand-lever 10 is provided for operating the follower-plate and plunger, and a coiled spring is provided on the plunger to normally hold its lower end flush with the bottom of the neck-former 8, so as to enter the mold in this position.

The mold rests on the table over an opening through which a blank-mold 11 is passed to convey a sufficient quantity of molten glass to the mold, and the operation of my improvements is as follows: The blank-mold 11 with molten glass therein is brought by turning the table of machine into position beneath the plunger and follower-plate, and the follower-plate 6 with the plunger 9 therein is moved down into the blow-mold. The top of the follower-plate effectually closes the open top of the mold and the neck-former with plunger therein is disposed centrally in the neck of the mold. The plunger is then forced down into the molten glass to force the glass up between the neck-former 8 and the neck of the mold, thus forming the neck of the bottle. The plunger is then permitted to move upward to its former position flush with the bottom of the neck-former, when both the follower-plate and plunger can be elevated from the mold and the latter moved beneath a suitable blow-head for blowing, the blank-mold 11 being previously withdrawn from the blow-mold.

With my improvements a bottle having a perfectly smooth neck interior is made, for the reason that the first upward movement of the plunger to its position within or flush with the neck-former relieves the molten glass which forms the bottle-neck of the suction of the removal of the plunger, and as the follower-plate is elevated a sufficient quantity of air will flow down between the plunger and neck-former to relieve the neck of the bottle of any suction, and thereby prevent drawing the glass and consequent unevenness in the surface thereof.

A great many slight changes might be made in the general form and arrangement of the parts described without departing from my invention, and hence I do not confine myself to the precise details set forth, but consider myself at liberty to make such slight changes and alterations as fairly fall within the spirit and scope of my invention.

Having fully described my invention, what I claim as new, and desire to secure by Letters Patent, is—

1. The combination in a bottle-making machine, of means for preventing the formation of inequalities within the neck of the bottle, said means comprising a follower-plate having a tubular neck-former rigid therewith and depending therefrom, a plunger fitting the bore of the neck-former and closing the lower end thereof in either of its extreme positions to prevent glass entering the neck-former, and means for raising and lowering the plunger.

2. The combination in a bottle-making machine, of means for preventing the formation of inequalities within the neck of the bottle, said means comprising a follower-plate having a tubular neck-former rigid therewith and depending therefrom, a plunger fitting the bore of the neck-former and closing the lower end thereof in either of its extreme positions to prevent glass entering the neck-former, means for forcing the plunger downward in the neck-former to press the glass around the outside of the neck-former, and a spring to return the plunger to a position approximately flush with the lower end of the neck and effectually closing the lower end of the latter.

In testimony whereof I have signed this specification in the presence of two subscribing witnesses.

JAMES D. COX.

Witnesses:
ROBT. S. SCHILLER,
JAMES J. REEVES.